Jan. 12, 1960   R. M. SHEFFER   2,920,648
DEVICE TO ELIMINATE VORTICES IN FUEL TANKS
Filed Oct. 31, 1956
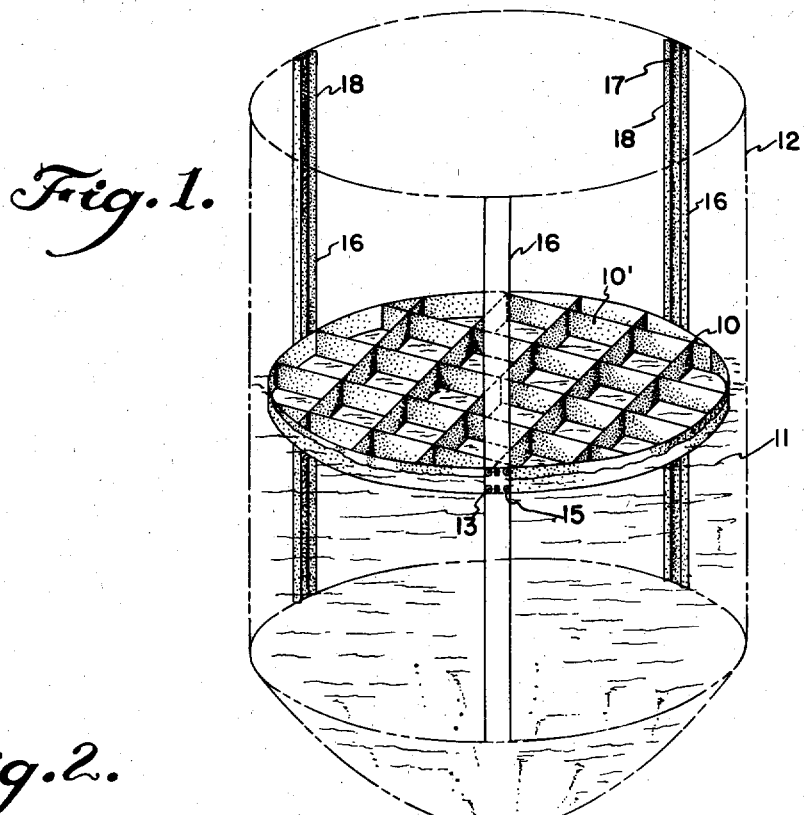
Fig. 1.
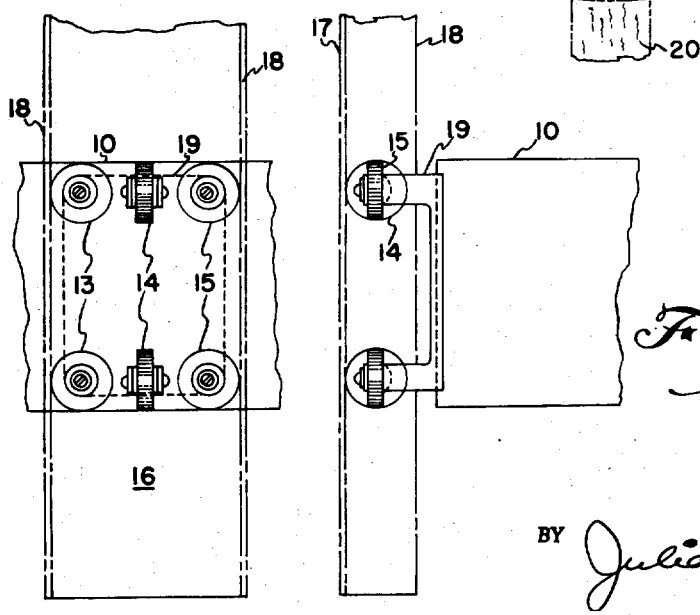
Fig. 2.
Fig. 3.
INVENTOR
ROBERT M. SHEFFER
BY
ATTORNEY 2,920,648

DEVICE TO ELIMINATE VORTICES IN FUEL TANKS

Robert M. Sheffer, Baltimore, Md., assignor to The Martin Company, a corporation of Maryland Application October 31, 1956, Serial No. 619,609

9 Claims. (Cl. 137—582)

This invention relates to a device for use in a liquid-containing tank or container for eliminating undesired movement of the liquid in the tank, and more particularly to a device for eliminating vortices in the propellant tanks of liquid fuel rockets or the like.

It is well known that as a liquid is pumped or drained from a tank, a vortex is often formed in the liquid. As a result of this vortex, slugs of air may be entrained in the liquid leaving the tank. This condition may be highly undesirable, for in the case of a turbopump-fed rocket engine, slugs of air in the fuel leaving the tank may well cause cavitation of the pump, and often explosive failure.

It has been found that if the surface of liquid is physically restrained so that rotation of the surface of the liquid is inhibited, the possibility of the formation of a vortex is eliminated. Therefore, according to this invention a partially submerged grating or grid-like assembly is provided in the tank or container to prevent rotation of the surface of the liquid. The grating itself is restrained against rotation, and preferably is designed to float on the surface of the liquid in such a manner as to move progressively along the tank as a result of changes in liquid level therein. Since the grating effectively prevents the surface of the liquid from rotating, a vortex cannot form in the body of the liquid. Furthermore, the liquid surface is essentially compartmented by the grating, thereby reducing sloshing of the liquid in the tank.

By the elimination of vortiginous motion and sloshing in the tank, a more nearly level liquid surface is maintained, which is important not only from the standpoint of reliability of operation of the rocket, but also from the standpoint of the quantity gauging problem, for in the propellant tanks of a missile, a constant measure of liquid level is required for the proper utilization of the maximum quantity of the propellants.

Since it is important that the grating be restrained against rotation, appropriate guide means can be located along the path of travel of the grating in the tank, the arrangement being such that the grating can freely move to accommodate the changes in liquid level as liquid is removed from the tank.

Other features and advantages of this invention will become apparent from the following description, reference being made to the accompanying drawings in which:

Figure 1 illustrates a portion of a tank in which a grating according to this invention has been operably installed to prevent vortiginous movement of the liquid in the tank;

Figure 2 is a detailed view of a guide roller arrangement such as may be used to prevent rotation of the grating with respect to the tank; and Figure 3 is a side view of the guide roller device as shown in Fig. 2.

In Fig. 1, a preferred embodiment of this invention is revealed wherein a grating or grid-like assembly 10 is located in a suitable tank or container 12, such as a propellant tank for a liquid fuel rocket or other missile. The grating 10 preferably floats partially submerged on the surface of the liquid 11 contained in the tank, and may be in the form of an interlaced structure. For instance, the grid can comprise a number of members 10' connected to each other at right angles in order to form a number of compartments. When the grid is arranged to effectively compartment the surface of the liquid contained in the tank, sloshing is reduced, which simplifies the quantity gauging problem.

As should be apparent, a grid in the nature of member 10 may be suitably designed for use in either propellant tank utilized in a liquid fuel rocket. For example, if the fuel used is of the kerosene base type, the members 10' can be made out of wood, such as of plywood ½ inch thick. For liquid oxygen tanks, the grid members 10' can be made from thin aluminum sheets formed into tubes of elongated cross section and sealed by welding. As should be apparent, the material used could be selected so that the grating will float at the desired level upon the surface of the propellant.

It is to be noted that the propellant tanks of rockets usually remain unfilled until a time just before launching, and also that the time of powered flight of a rocket is comparatively short. For these reasons, the material used as the grating may even be of such a nature that it tends to be slowly attacked or dissolved by the propellant, so long as the structural impairment of the grating would take a period of several hours. Preferably, the grating floats approximately 75% submerged in the liquid of the tank.

Since a vortex by its nature commences at the surface of a body of liquid, the grating according to this invention will be effective to prevent vortiginous movement of the liquid. Inasmuch as propellant is constantly being withdrawn from outlet 20 of the rocket tank during powered flight, it is desirable that the surface of the liquid be restrained against rotation for virtually the entire extent of the movement of the surface of the liquid in the tank. Fixed structures in the tank would either be too weighty to be carried aboard a rocket, or else unsatisfactory to restrain the surface of the liquid against rotation. Therefore, the grating 10 according to this invention accomplishes the result of preventing vortiginous motion in the tank for all liquid levels in the tank by being movable along the extent of the tank as the liquid level in the tank changes. Since it would be undesirable for the grating to rotate as it moves to accommodate changes in liquid level, a guide means may be provided not only to prevent rotation of the grating, but also to prevent the grating from becoming twisted with respect to the walls of the tank so as to become caught and prevented from moving further as the liquid level changed.

The guide means can consist of a plurality of rollers such as rollers 13, 14, 15 shown in Fig. 2 of the drawing. A plurality of channels 16 may be provided extending along the side walls of the tank 12, and these channels may have two side surfaces 18, and an intermediate or inner surface 17. The rollers may be carried by roller supporting means 19, disposed in such a manner that one set of rollers 13 engage one inner side of the channel while the oppositely disposed set of rollers 15 engage the opposite inner side of the channel. Intermediate rollers may engage the bottom surface 17 of the channel and in this manner insure proper travel of the grid with respect to the channels. By the provision of an appropriate number of channel members 16 and guide roller devices, the grating can be caused to travel smoothly along the extent of the tank during all flight conditions. In addition to preventing undesired rotation of the grating, the described guide roller arrangement also prevents twisting and racking of the grating, thus assuring that the grating will not become lodged in a fixed position in which it would be unable to function in the proper manner.

It should be understood that the apparatus herein illustrated and described is intended to be representative of a basic embodiment of this invention, and changes may be made herein without departing from the teachings of the invention and the scope of the appendant claims.

I claim:

1. An assembly for use in a container for liquid to prevent vortiginous movement of the liquid in the container as liquid is removed therefrom, comprising a grating designed to float partially submerged in the liquid and to move with the liquid as the liquid level changes, and means to inhibit rotation of said grating and to prevent misalignment thereof as it moves to accommodate said changes in liquid level.

2. The assembly as defined in claim 1 in which said means includes guide means for maintaining said grating in guiding relationship as it move as a result of a change of liquid level.

3. An assembly for use in a container for liquid to prevent undesirable movement of the liquid therein as the liquid level of the container changes, comprising a grating extending substantially over the entire surface of the liquid and designed to move with the liquid as the liquid level changes, and means to inhibit rotation of said grating and to prevent misalignment thereof during such movements.

4. A movable assembly for use in a liquid container, comprising a container, a grating arranged to travel along a defined path in said container for preventing undesirable movements of liquid in said container, guide means disposed along the path of travel of said grating in the container, means on said grating engaged by said guide means to prevent undesirable rotation of said grating in said container, and to maintain said grating in guided relationship along its path of travel in said container.

5. An assembly for use in a container for liquids to prevent vortiginous movement of the liquid in the container comprising a container, a grid-like member adapted to be maintained adjacent the surface of the liquid in said container, and guide means disposed substantially transverse to the level of the liquid for preventing undesired rotation of said grid-like member in said container, said grid-like member comprising a plurality of intersecting members defining a number of discrete areas on the surface of the liquid to inhibit vortiginous movement of the liquid, said guide means comprising at least two guide ways extending at least a portion of the height of said container, means on said grid-like member for engaging said guide ways, said guide means making it possible for said grid-like member to move a substantial portion of the height of said container while restrained against rotation therein.

6. The assembly as defined in claim 5 in which said container for liquids is a propellant tank for use with a liquid fuel rocket, with an outlet at the bottom thereof for the egress of liquid during powered flight of the rocket.

7. A moveable assembly for use in a container for liquid in order to prevent vortiginous movement of said liquid as it is withdrawn from the container comprising, a movable grid-like device constructed of compartively lightweight material and adapted to float on the surface of the liquid, guide means for insuring freedom of movement of said device by preventing it from becoming misaligned as it moves to accomodate a change in liquid level, said device being restrained by said guide means against rotation whereby to prevent said vortiginous movement.

8. The movable assembly as defined in claim 7 in which said grid-like device is constructed to compartmentalize the surface of the liquid in which it floats into a plurality of smaller areas, whereby to inhibit sloshing of the liquid in addition to preventing vortiginous movement thereof.

9. An assembly for use in a container of liquid adapted to travel along the container as liquid is removed in order to prevent vortiginous movement of said liquid, comprising a grid-like member adapted to float partially submerged on the surface of the liquid and to move accordingly as the liquid level changes, and guide means for preventing rotation of said grid-like member, said guide means comprising at least two guideways extending along at least a portion of the path of travel of said grid-like member, roller means mounted upon portions of said grid-like member for engaging said guide means whereby said grid-like member can move freely in a guided relationship to accommodate changes in liquid level.

References Cited in the file of this patent

UNITED STATES PATENTS

| | | |
|---|---|---|
| 1,062,847 | Park | May 27, 1913 |
| 1,294,265 | Hirsch | Feb. 11, 1919 |
| 1,343,812 | Dickerson | June 15, 1920 |